(12) United States Patent
Hamrin (10) Patent No.: US 10,391,447 B2
(45) Date of Patent: Aug. 27, 2019

(54) METHOD AND PLANT FOR CO$_2$ CAPTURE

(71) Applicant: CapSol-EoP AS, Oslo (NO)

(72) Inventor: Stellan Hamrin, Kungsör (SE)

(73) Assignee: CAPSOL-EOP AS, Oslo (NO)

( * ) Notice: Subject to any disclaimer, the term of this patent is extended or adjusted under 35 U.S.C. 154(b) by 0 days.

(21) Appl. No.: 15/756,420

(22) PCT Filed: Sep. 6, 2016

(86) PCT No.: PCT/EP2016/070974
§ 371 (c)(1),
(2) Date: Feb. 28, 2018

(87) PCT Pub. No.: WO2017/042163
PCT Pub. Date: Mar. 16, 2017

(65) Prior Publication Data
US 2018/0243688 A1    Aug. 30, 2018

(30) Foreign Application Priority Data
Sep. 8, 2015 (NO) .................................. 20151155

(51) Int. Cl.
*B01D 53/96* (2006.01)
*B01D 53/62* (2006.01)
(Continued)

(52) U.S. Cl.
CPC ............. *B01D 53/62* (2013.01); *B01D 53/18* (2013.01); *B01D 53/343* (2013.01); *B01D 53/78* (2013.01);
(Continued)

(58) Field of Classification Search
None
See application file for complete search history.

(56) References Cited

U.S. PATENT DOCUMENTS

| | | |
|---|---|---|
| 7,328,581 B2 | 2/2008 | Christensen et al. |
| 2007/0006565 A1 | 1/2007 | Fleischer et al. |
| 2008/0072762 A1 | 3/2008 | Gal |

FOREIGN PATENT DOCUMENTS

| | | |
|---|---|---|
| EP | 2 105 188 A1 | 9/2009 |
| EP | 2 511 001 A1 | 10/2012 |

(Continued)

OTHER PUBLICATIONS

International Search Report for PCT/EP2016/070974 (PCT/ISA/210) dated Nov. 24, 2016.
(Continued)

*Primary Examiner* — Anita Nassiri-Motlagh
(74) *Attorney, Agent, or Firm* — Birch, Stewart, Kolasch & Birch, LLP (57) ABSTRACT

A method and plant for capturing CO$_2$ from a CO$_2$ containing exhaust gas (1), where the exhaust gas is compressed (10) and thereafter cooled (13, 15, 22) before the exhaust gas is introduced into an absorber (30), where the exhaust gas is brought in counter-current flow with an aqueous CO$_2$ absorbent solution (49), to give a lean exhaust gas (31) that is withdrawn from the absorber (30), reheated 22, 13) against incoming compressed exhaust gas, and thereafter expanded (34) and released into the atmosphere (4), where the aqueous CO$_2$ absorbent solution is an aqueous potassium carbonate solution, and that the steam and CO$_2$ withdrawn from the regenerator (40) is cooled in a direct contact cooler (61) by counter-current flow of cooling water (62), to generate a gaseous flow (70) of cooled CO$_2$ and steam that is withdrawn for compression and drying of the CO$_2$, and a liquid flow (64) of cooling water and condensed steam that is withdrawn and flashed (80), to give a cooled liquid phase (84) that is recycled as cooling water for the direct contact cooler (61) for the withdrawn CO$_2$ and steam, and a gaseous (Continued)

phase (81) that is compressed (82) and thus heated, and introduced into the regenerator (40) as stripping steam (83).

14 Claims, 2 Drawing Sheets

(51) Int. Cl.
    *B01D 53/18*     (2006.01)
    *B01D 53/78*     (2006.01)
    *F23J 15/04*     (2006.01)
    *B01D 53/34*     (2006.01)

(52) U.S. Cl.
CPC .............. *B01D 53/96* (2013.01); *F23J 15/04* (2013.01); *B01D 2251/306* (2013.01); *B01D 2251/606* (2013.01); *B01D 2257/504* (2013.01); *B01D 2258/0283* (2013.01); *B01D 2259/65* (2013.01); *B01D 2259/652* (2013.01); *Y02A 50/2342* (2018.01); *Y02C 10/04* (2013.01); *Y02C 10/06* (2013.01); *Y02E 20/326* (2013.01)

(56) References Cited

FOREIGN PATENT DOCUMENTS

| | | |
|---|---|---|
| EP | 2 200 731 B1 | 4/2014 |
| FR | 2 938 454 A1 | 5/2010 |
| WO | WO 00/48709 A1 | 8/2000 |
| WO | WO 2004/001301 A2 | 12/2003 |
| WO | WO 2007/075466 A2 | 7/2007 |
| WO | WO 2013/166301 A1 | 11/2013 |

OTHER PUBLICATIONS

Norwegian Search Report for Patent Application No. 20151155, reported on Apr. 7, 2016.

Written Opinion of the International Searching Authority for PCT/EP2016/070974 (PCT/ISA/237) dated Nov. 24, 2016.

METHOD AND PLANT FOR CO$_2$ CAPTURE

TECHNICAL FIELD

The present invention relates to CO$_2$ capture from a gas, such as, but not limited to, an exhaust gas from combustion of carbonaceous fuel or any industrial gas having a high concentration of CO$_2$. The present invention more specifically relates to improvements in CO$_2$ capture at elevated pressures, and to improvements reducing the heat loss in connection with CO$_2$ capture.

BACKGROUND ART

The increase in CO$_2$ concentration in the atmosphere and the greenhouse effect caused by CO$_2$ is of great concern, and has caused a change towards renewable energy resources and an environmental pressure towards stopping or at least reducing the use of fossil fuels. However, due to both the low cost of carbonaceous fuels and the steady growing demand for energy, and especially energy in the form of electricity for further development in the less industrial parts of the world, carbonaceous fuels will be important as energy sources for decades to come. CO$_2$ capture and storage/deposing of CO$_2$ to prevent the release of CO$_2$ into the atmosphere and hence mitigate the increasing CO$_2$ concentration, has therefore been proposed. Many projects on CO$_2$ capture have been suggested, but only a few have been developed from the idea or drawing stage to actual projects, due to both the investment cost and running cost of such plants, and the lack of political support.

Most suggestions for CO$_2$ capture plants are based on post combustion capture of CO$_2$ from the exhaust gases from an industry plant, such as a power plant based on carbonaceous fuels. Typically, CO$_2$ is captured from the exhaust gas by bringing the exhaust gas in intimate contact with a CO$_2$ absorbent, most commonly an aqueous solution of an amine absorbent, a carbonate absorbent, etc., normally at a pressure close to atmospheric pressure or slightly higher.

WO 2004001301 A2, i.a. granted as U.S. Pat. No. 7,328,581, to Sargas AS, now assigned to CO2 CapSol AS, relates to a method and plant for generation of power by combustion of carbonaceous fuel under elevated pressure of typically 8 to 20 bar, capturing CO$_2$ at the same pressure by means of an aqueous potassium carbonate solution, before the CO$_2$ lean exhaust gas is expanded and released into the surroundings. An important feature of U.S. Pat. No. 7,328,581 is that CO$_2$ is captured at substantially the same pressure as the combustion pressure for the carbonaceous fuel. CO$_2$ capture under elevated pressure, as in U.S. Pat. No. 7,328,581, provides CO$_2$ partial pressure, which is substantially higher than if the CO$_2$ capture was to be performed at atmospheric pressure. It also reduces the total gas volume. The speed of reaction and system equilibria are highly dependent on the partial pressure of CO$_2$ in the gas phase. Higher partial pressure of CO$_2$ greatly improves the capture rate and reduces the absorbent regeneration energy. Furthermore, reduced gas volume greatly facilitates the design and construction of CO$_2$ capture plants, in particular the CO$_2$ absorber.

There are two classes of CO$_2$ absorbents. These are inorganic, mainly aqueous potassium carbonate, and organic, mainly aqueous solutions of amines, mixtures of amines, or amino acids. Advantages with inorganic absorbent over organic absorbents are potentially decisive for very large scale CO$_2$ capture. This includes stability in the presence of oxygen, low cost, availability in the significant quantities required for large scale CO$_2$ capture and, if operated at elevated pressure, low specific regeneration energies. In contrast, organic absorbents are unstable in the presence of oxygen, in particular at high pressure where the oxygen partial pressure is higher, forming toxic and carcinogenic degradation products that will be released into the atmosphere together with the CO$_2$ depleted exhaust gas. They have high cost, and limited availability since production is multifaceted and includes the production of ammonia, a process which emits CO$_2$. Specific regeneration energy is high in particular if operated at atmospheric pressure. This is important since one of the principal challenges with CO$_2$ capture is parasitic energy consumption.

U.S. Pat. No. 7,328,581 requires combustion at elevated pressure, as indicated above, and intimate integration of the combustion and power generation part and the CO$_2$ capture part of such a plant. Accordingly, U.S. Pat. No. 7,328,581 is most suitable for new construction of power plants, and is normally not suitable as a solution for CO$_2$ capture for existing plants.

WO 2013166301 A1, to Mecs, Inc., relates to a regenerative recovery of contaminants, exemplified by sulphur dioxide, from effluent gases. Nothing is mentioned about the pressure of the gas to be cleaned, or of recovery of heat energy in the incoming gas. The absorbent for removal of the contaminants, and heat of reactions for regeneration of the absorbent, are regenerated by different features to increase the energy efficiency of the process.

WO2007075466 A2, to Fluor Technologies Corporation, describes an integrated compressor/stripper configuration and methods, there regenerated absorbent is flashed and separated in a liquid phase that is recycled back to an absorber, and a gaseous phase that is compressed and introduced as stripper steam into the stripper.

WO 0048709, to Norsk Hydro ASA, relates to a method for capturing CO$_2$, from an exhaust gas of a gas turbine based power plant, where expanded and cooled exhaust gas from the gas turbine power plant is re-compressed to a pressure of 5 to 30 bar, typically 7 to 20 bar, and cooled before the compressed gas is introduced into an absorber and brought in contact with an amine absorbent in an absorber of a CO$_2$ capture plant. The CO$_2$ depleted exhaust gas leaving the absorber is preferably re-heated, to increase the power to be generated by the expanding gas, and to increase the overall efficiency of the total plant. Such an integration is vital to be able to build such a plant so that it is sufficiently energy efficient, i.e. that the energy output of the plant in the form of useful energy, such as electrical power, is sufficiently high compared to the total energy of combustion in the gas turbine. Accordingly, it is highly unlikely that this concept can be built to be economically viable.

The object of the present invention is to provide a post combustion CO$_2$ capture unit that is sufficiently energy efficient to be economically viable, allowing the CO$_2$ capture unit to be added to an existing CO$_2$ source plant, such as a power plant fired with carbonaceous fuel, without having to make internal rebuild of the CO$_2$ source plant. Use of only electricity as its energy source is one of the keys to obtain this.

SUMMARY OF INVENTION

According to a first aspect the present invention relates to a method for capturing CO$_2$ from a CO$_2$ containing exhaust gas, where the exhaust gas is compressed and thereafter cooled before the exhaust gas is introduced into an absorber, where the exhaust gas is brought in counter-current flow with an aqueous $CO_2$ absorbent solution introduced into the absorber, to give a lean exhaust gas that is withdrawn from the absorber, reheated against incoming compressed exhaust gas, and thereafter expanded and released into the atmosphere, where the rich absorbent having absorbed $CO_2$, is collected at the bottom of the absorber, withdrawn therefrom and introduced into a regenerator in which the $CO_2$ rich absorbent is stripped to release $CO_2$ by counter-current flow of steam to give a lean absorbent, withdrawing steam and $CO_2$ from the top of the regenerator, collecting lean absorbent at the bottom of the absorber, withdrawing the lean absorbent from the absorber, splitting the withdrawn lean absorbent into two part flows, a first flow that is heated and vaporized in a reboiler, and introducing the regenerated absorbent into the regenerator as stripping steam, and a second flow that is returned to the absorber as lean absorbent, characterized in that the aqueous $CO_2$ absorbent solution is an aqueous potassium carbonate solution, and that the steam and $CO_2$ withdrawn from the regenerator is cooled in a direct contact cooler by counter-current flow of cooling water, to generate a gaseous flow of cooled $CO_2$ and steam that is withdrawn for compression and drying of the $CO_2$, and a liquid flow of cooling water and condensed steam that is withdrawn and flashed, to give a cooled liquid phase that is recycled as cooling water for the direct contact cooler for the withdrawn $CO_2$ and steam, and a gaseous phase that is compressed and thus heated, and introduced into the regenerator as stripping steam. Cooling of the steam and $CO_2$ withdrawn from the top of the regenerator by direct contact cooling, withdrawing the cooling water and condensed steam, flashing thereof to separate it into a gaseous phase that is compressed and introduced into the regenerator as stripping steam, and recycling the liquid phase, is a very efficient in recycling of heat energy into the stripper. The increased recycling of heat energy, and thus energy conservation. Aqueous solutions of carbonates as $CO_2$ absorbents are less energy efficient, and needs higher temperature steam for regeneration of the absorbent, than amine based aqueous $CO_2$ absorbents. Amines or by-products caused by degradation of amines during the $CO_2$ capture process, are known to be potentially carcinogenic, potentially poisonous, and to create large amounts of waste. The mentioned feature for energy conservation, together with $CO_2$ capture at an elevated pressure, makes it possible to use carbonates, which are environmentally better than amines, for $CO_2$ capture.

According to one embodiment, the second flow of lean absorbent is flashed to generate steam that is compressed and introduced into the regenerator as stripping steam. Flashing of the lean absorbent before introduction thereof into the absorber, compressing the generated steam and introducing the compressed steam into the regenerator as stripping steam, further improves the energy efficiency for the $CO_2$ capture.

According to one embodiment, the lean first flow of lean absorbent introduced into the reboiler is heated and partly evaporated against steam generated in a steam cycle against hot compressed incoming exhaust gas. The incoming compressed exhaust gas is too hot to be introduced into the absorber and has to be cooled. The main part of the cooling is done by heat exchanging against outgoing $CO_2$ lean exhaust gas. For efficient heat exchanging, the hot incoming gas flow should have a volume substantially as the colder outgoing gas flow. However, due to the removal of $CO_2$ the volume of the outgoing gas flow is lower than the incoming warm gas flow. Introduction of the heat exchanger for heating steam for the reboiler for the regenerator, regains the balance over the heat exchangers for cooling the incoming exhaust gas.

According to one embodiment, the incoming exhaust gas is compressed from a pressure between 0.7 and 1.4 bara, such as between 1 and 1.1 bara, to a pressure between 8 and 20 bara.

According to a second aspect, the invention relates to a plant for capturing of $CO_2$ from an $CO_2$ containing exhaust gas, comprising an exhaust withdrawal pipe(s), one or more exhaust gas compressor(s) for compression of the exhaust gas, a compressed exhaust gas line for leading the compressed gas into one or more heat exchangers, for cooling of the compressed exhaust gas against $CO_2$ lean exhaust gas, a cooled exhaust gas pipe connected to an absorber for absorption of $CO_2$ by counter-current flow against a liquid absorbent, a lean exhaust gas pipe for introduction of the lean exhaust gas into heat exchanger(s) for heat exchanging against hot compressed exhaust gas, a cooled lean exhaust gas pipe for transferring the heated lean exhaust gas from heat exchanger(s) to a turbine for expanding of the lean exhaust gas, a lean absorbent pipe for introduction of lean absorbent into the absorber, a rich absorbent pipe to withdraw rich absorbent from the absorber, the rich absorbent pipe being connected to a regenerator for introduction of the rich absorbent into the regenerator, a reboiler for generation of stripping steam, and a steam introduction pipe to introduce the generated stripping steam into the regenerator, a lean absorbent withdrawal pipe connected to the lean absorbent pipe, for withdrawal of lean absorbent for recycling into the absorber, an overhead withdrawal pipe connected to the regenerator for withdrawing steam and $CO_2$ released from the absorbent in the regenerator, wherein the overhead withdrawal pipe is connected to a recuperator cooler, wherein the $CO_2$ and steam are cooled by direct contact cooling against cooling water, a $CO_2$ withdrawal pipe for withdrawal of a gaseous phase from recuperator cooler, and a water withdrawal pipe for withdrawal of cooling water and condensed steam from the recuperator cooler, one or more flash tank(s) connected to the water withdrawal pipe for flashing the withdrawn water to separate a gaseous phase, and a liquid phase, a cooling water recycle line to recycle the liquid phase into the recuperator cooler, and a compressor for compression of the gaseous phase, and a compressed steam pipe for introduction into the regenerator as additional stripping steam.

According to one embodiment, a flash tank is arranged for flashing the lean absorbent withdrawn in pipe to generate a steam phase and a liquid phase, where a compressor is arranged to compress the steam phase, and a compressed flash pipe is arranged to lead the compressed steam into the regenerator as addition stripping steam, and the lean absorbent pipe is arranged to introduce the liquid phase as lean absorbent into the absorber.

According to a second embodiment, a reboiler heat exchanger (15) is arranged to generate steam by cooling incoming exhaust gas from an exhaust connection pipe (14), and where a reboiler steam return pipe (20) is arranged to lead the generated steam into the reboiler (42) to heat vaporize the lean absorbent therein.

DETAILED DESCRIPTION OF THE INVENTION

Figure 1:
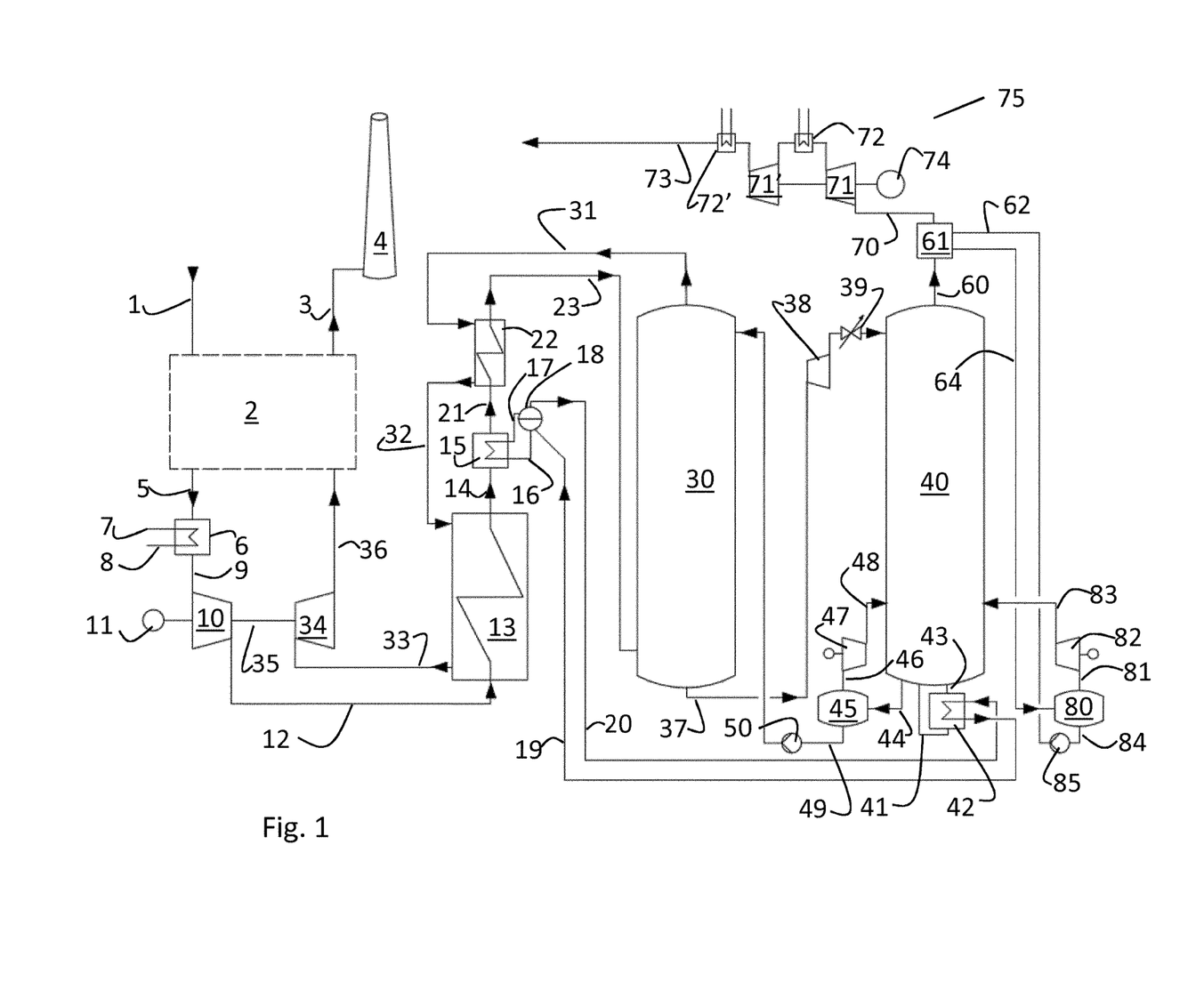
FIG. 1 is an overview illustration of a retrofit $CO_2$ capture plant according to the present invention.

FIG. 1 illustrates the basic principle of a $CO_2$ capture plant according to the present invention, where exhaust gas from a not shown source, such as a coal or gas fired power plant, or any other industrial $CO_2$ generating plant, is introduced in an exhaust intake line 1 and introduced into a power plant interface 2. The interface 2 is not a part of the present invention and is therefore not discussed in detail. However, the interface will include different means to direct the exhaust gas to the $CO_2$ capture plant as described further below, or release the exhaust gas via an exhaust outlet pipe 3 and through a stack 4, if needed. The most important task of the interface is to allow the power plant, or other $CO_2$ generating source, to operate independent on the $CO_2$ capture plant, such as in case of any malfunctioning of the $CO_2$ capture plant resulting in a too high backpressure for the exhaust gas, or if the $CO_2$ capture plant has to be stopped of any reason. A change in the backpressure at the outlet of a power plant or any other industrial plant, may be detrimental to the power plant or industrial plant, and has to be avoided. The interface includes means to avoid disturbance of the power plant or other $CO_2$ generating source that may damage the power plant or other $CO_2$ generating source, or the operation thereof. Such means may include active or passive means, such as valves, fans, swinging guide doors etc. for directing the exhaust gas flow into the $CO_2$ capture plant and/or the stack depending on the capacity of the $CO_2$ capture plant, back pressure etc. Additionally, the interface 2 may include equipment for removing or substantially reducing the concentration of components in the exhaust gas that may be detrimental to the $CO_2$ capture plant, such as particles, NOx, SOx, etc., equipment that are well known for the skilled person.

In the present description and claims, the term "exhaust gas" is used to encompass any process gas being a result of the combustion of carbonaceous fuel, or a $CO_2$ containing gas resulting from any industrial process.

Exhaust gas to be introduced into the $CO_2$ capture plant is withdrawn from the interface 2 through exhaust withdrawal pipe(s) 5, 9, optionally via an exhaust gas cooler 6, for cooling of the exhaust gas. A cooling medium, water or any other convenient cooling medium, is introduced via a cooling medium introduction pipe 7, and withdrawn via a cooling medium withdrawal pipe 8. The heat carried by the cooling medium may be used for any process that needs heat at the temperature in question. The need for the cooling unit depends on the temperature of the exhaust gas to be introduced into the $CO_2$ capture plant, i.e. the temperature in exhaust gas withdrawal line 5. The temperature in an incoming exhaust gas from a coal fired power plant, or a gas turbine power plant, may be from about 150 to about 70° C., depending on the actual plant design. Exhaust gas from other sources may be warmer or colder, dependent on the source. The pressure of the incoming exhaust gas is normally close to atmospheric pressure, normally slightly higher such as about 1.01 to 1.1, typically 1.04 bara.

The optionally cooled exhaust gas in exhaust gas pipe 9 is introduced into an exhaust gas compressor 10, operated with a motor 11, typically an electrical motor, and the compressed, and thereby heated, exhaust gas is withdrawn through a compressed exhaust gas pipe 12. Preferably, the gas inlet temperature to be introduced into the exhaust gas compressor 10, is 35° C. or lower, such as 25° C. or lower. The skilled person will understand that whenever a compressor or expander is mentioned in the present description and claims, the expressions cover either single compressors or expanders or compressors or expanders connected in series and/or in parallel, if it is not clearly stated that the expressions are used to describe single units, only.

The incoming compressed and heated exhaust gas in pipe 12 is introduced into an exhaust gas heat exchanger 13, in which the in incoming exhaust gas is cooled against $CO_2$ depleted exhaust gas as will be further described below. The exhaust gas is compressed to a pressure higher than 5 bara, more preferred higher than 8 bara, such as about 12 bara, to give high partial pressure of $CO_2$ for efficient carbon capture, and to reduce the volume of gas to be treated. The pressure is preferably kept below 20 bara, as this is sufficient for the effective use of hot potassium carbonate absorbent and the specific compression energy to pressures above 20 bare, is assumed to be prohibitively high. The compression of the exhaust gas causes heating of the exhaust gas. Dependent on the temperature of the exhaust gas into the compressor and the pressure to which the exhaust gas is compressed, the temperature of the gas leaving the compressor 10 is typically from 250 to 400° C.

The heat exchanger 13 is a gas/gas heat exchanger for cooling the compressed and thus heated exhaust gas introduced through compressed exhaust pipe 12 to heat $CO_2$ depleted, or lean exhaust gas.

The compressed exhaust gas is cooled in the heat exchanger to a temperature of typically 150 to 200° C., and is withdrawn through an exhaust gas connection pipe 14, and introduced into a reboiler heat exchanger 15, for generation of steam for a reboiler 42, being further described below. Typically, the exhaust gas is heat exchanged against water circulating between the heat exchanger 15 and the reboiler at an elevated pressure. The pressure of the circulating water depends on the pressure at which the water is to be evaporated/condensed. Typically, the pressure of the circulating water is about 2.5 bara, giving a boiling point/condensation point of about 128°. Water to be evaporated is introduced via a water introduction pipe 16, and steam or hot water and steam is/are withdrawn via a water withdrawal pipe 17, both preferably connected to a steam drum 18. A reboiler water return pipe 19 is arranged to deliver water from a reboiler 42, see below, to the heat exchanger 15, optionally via steam drum 18, and a reboiler steam return pipe 20 is arranged to withdraw steam from the heat exchanger 15 or steam drum 18 and return the steam for generating steam from $CO_2$ absorbent, in the reboiler 42.

The exhaust gas cooled in heat exchanger 15 is withdrawn in a connection pipe 21, typically at a temperature of 130 to 140° C., and introduced into a second gas/gas heat exchanger 22, wherein the exhaust gas is further cooled, typically to a temperature of about 110 to 120° C., against lean exhaust gas as will be explained below.

Cooled incoming exhaust gas is withdrawn from heat exchanger 22 in a cooled exhaust gas pipe 23, and introduced into an absorber 30, where the exhaust gas is introduced close to the bottom of the absorber, and brought in countercurrent flow to a $CO_2$ absorbent that is introduced close to the top of the absorber. The skilled person will understand that the absorber 30 preferably comprises a packing to increase the contact surface and contact time between absorbent and exhaust gas. The currently preferred $CO_2$ absorbent is an aqueous solution of a carbonate, such as potassium carbonate, which is an efficient and non-toxic $CO_2$ absorbent, especially at higher partial pressures of $CO_2$, as obtainable when the pressure in the absorber typically is from about 8 to about 20 bara.

$CO_2$ depleted exhaust gas is withdrawn from the top of the absorber through a depleted exhaust gas pipe 31, at a temperature of typically 90 to 100° C., such as about 95° C., and introduced into the above described second gas/gas heat exchanger 22, where the $CO_2$ depleted, or lean, exhaust gas is heated against incoming exhaust gas as described above, to a temperature of about 115 to 125° C. The lean exhaust gas heated in heat exchanger 22 is withdrawn in a lean exhaust gas connection pipe 32, and introduced into heat exchanger 13 for further heating to a temperature of typically 230 to 380° C. The lean exhaust gas heated in heat exchanger 13 is withdrawn into a heated lean exhaust gas pipe 33, and introduced into a lean exhaust gas expander, in which the lean exhaust gas is expanded to a pressure close to atmospheric pressure, resulting in cooling the lean exhaust gas to typically 70 to 90° C. The expanded lean exhaust gas is withdrawn via an expanded exhaust gas line 36, introduced into the interface 2, and released to the surroundings via the stack 4. The skilled person will understand that the lean, expanded and cooled exhaust gas does not have to be introduced into the interface 2, but may be released to the surroundings by a separate stack. However, of practical reasons, the stack for the power plant is often used to release the lean exhaust gas.

The expander 34 is preferably connected to the compressor 10, to reduce the duty of the motor 11 for operating the compressor 10, e.g. via a common shaft 35 as illustrated.

The aqueous $CO_2$ absorbent having absorbed $CO_2$ is collected at the bottom of the absorber 30, and is withdrawn via a rich absorbent line 37 preferably via an expander 38 and/or control valve 39 to reduce the pressure in the aqueous absorbent to facilitate the desorption, or regeneration of the absorbent when introduced from the rich absorbent line via said expander and/or control valve, into a regenerator 40. Typically, the absorbent to be regenerated is introduced into the regenerator 40 at a pressure of 1 to 3 bara, more preferred from 1.1 to 2 bara, such as about 1.2 bara.

Inside the regenerator 40 the absorbent having absorbed $CO_2$, or rich absorbent, is heated and stripped by counter-current flow of steam being introduced close to the bottom of the regenerator, whereas the rich absorbent is introduced close to the top of the regenerator.

Regenerated, or lean, absorbent is collected at the bottom of the regenerator 40. A part of the lean absorbent is withdrawn from the bottom of the regenerator 40 through a reboiler withdrawal pipe 41 and introduced into a reboiler 42, heated at least partly vaporized by steam introduced via the reboiler steam supply pipe 20, as described above. The heated and partly vaporized absorbent is introduced into the regenerator 40 through a reboiler recycle pipe 43. The skilled person will understand that the reboiler 43 may be heated by steam from other sources, or by electrical power, as a supplement or as a substitute for the steam from the reboiler heat exchanger 15.

The surplus part of the regenerated absorbent, i.e. the part that is not circulating between the reboiler and the regenerator, is withdrawn through a lean absorbent pipe 44 and introduced into a flash drum 45. Steam released in the flash drum 45 is withdrawn via a flash steam pipe 46 and is introduced into a compressor 47 and the compressed and thus heated steam is introduced into the lower part of the regenerator 40 as additional stripping gas via compressed flash steam pipe 48. Liquid lean absorbent cooled by the flashing is collected at the bottom of the flash drum 45, withdrawn via a flashed lean absorbent pipe 49, via a pump 50 and introduced into the absorber 30 as absorbent for absorbing $CO_2$. The skilled person will understand that serially connected flash drums, and corresponding compressors may be used to decrease the energy cost. The pressure in the flash drums may be reduced to a pressure being 0.1 to 0.5 bar lower than the pressure in the regenerator 40, such as to an absolute pressure of typically 0.6 bara to 1.1 bara. The steam generated by flashing is compressed to a pressure slightly higher, such as 0.1 bar higher than the pressure inside the regenerator, to facilitate injection of the steam into the regenerator.

A stream of $CO_2$ and steam is withdrawn from the regenerator 40 through an overhead withdrawal pipe 60 at the top of the regenerator 40 at a temperature of typically 90 to 100° C., and a introduced into a recuperator cooler 61 wherein the $CO_2$ and steam are cooled by direct contact cooling by counter-current flow of cooling water introduced via a cooling water pipe 62. Water being a combination of cooling water, and water condensed from the $CO_2$ and steam stream due to cooling, is separated from a $CO_2$ rich gas stream inside the recuperator cooler. The $CO_2$ rich gas stream is withdrawn through a $CO_2$ pipe 70, and the water is withdrawn through a cooling water return pipe 64.

The $CO_2$ rich gas stream in pipe 70 is introduced into a compression and drying unit 75 via a $CO_2$ withdrawal pipe 70 at a temperature of typically 60 to 80° C., such as about 70 to 75° C., at a pressure close to the pressure in the regenerator 40. The compression and drying unit 75 comprises one or more compressor(s) 71, 71', and one or more cooler(s) 72, 72', for cooling the compressed and thus heated gas, before the resulting compressed $CO_2$ is exported from the plant, and/or further treated for the intended use, through a $CO_2$ export pipe 73. The compressors 71, 71' are here illustrated by two compressors, but the skilled person will understand that the number of compressors, and corresponding coolers, is a question of design, capacity of the individual compressors, and requested pressure of the $CO_2$ in the $CO_2$ export pipe 73 and the possible uses of the generated waste heat. In the case of more than one compressor, the compressors may be operated by one common compressor motor 74, as illustrated, or by separate motors.

A substantial part of the energy put into the compression may also be recovered as hot water or steam in the coolers 72, 72', and the heat may be used for any convenient process requiring heat in the present $CO_2$ capture plant, or for any other purpose.

The heated cooling water and condensate withdrawn from the recuperator cooler 61 via return pipe 64, typically at a temperature 3 to 8° C. below the temperature in pipe 60, is introduced into a flash drum 80 where the cooling water return is separated into a gas phase and a liquid phase by reduction of the pressure in the flash drum compared to the pressure in the recuperator cooler 61. The gas phase is withdrawn in a flash withdrawal pipe 81, compressed in a compressor 82, and the compressed gas phase is introduced into the regenerator 40 as stripping steam through a compressed flash pipe 83.

The liquid phase in the flash drum 80, mainly water cooled by the flashing of steam, is withdrawn through a liquid flash withdrawal pipe 84, via a pump 85, and returned as cooling water to the recuperator cooler 61 via cooling water pipe 62.

Figure 2:
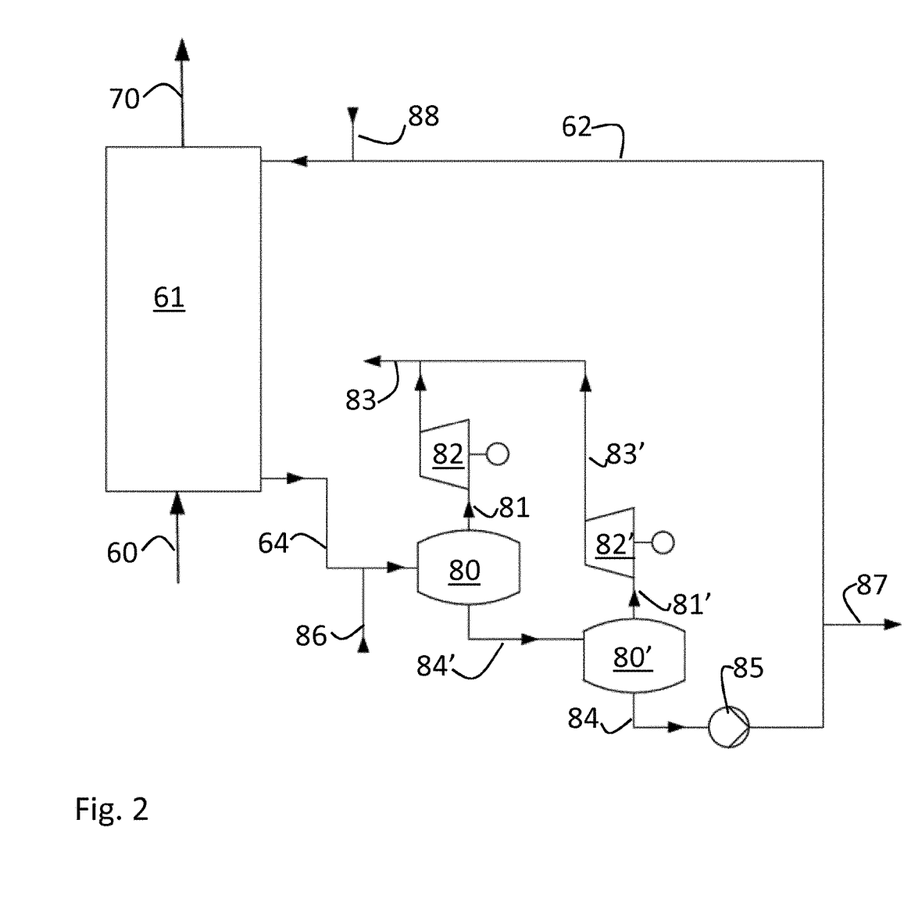
FIG. 2 is a detail view of a specific embodiment of the present invention.

FIG. 2 is a more detailed illustration of an alternative embodiment of the cooling water cycle for the cooling water for the recuperator cooler 61, wherein the return cooling water is introduced into the flash drum 80, as described above, and the gas phase is withdrawn and compressed as described above with reference to FIG. 1. However, the liquid phase is withdrawn through a connection pipe 84' and introduced into a second flash tank 80', at a lower pressure than in flash tank 80, to generate more steam, which is withdrawn through a second cooling water flash line 81', compressed in a compressor 82', and withdrawn from the compressor 82' in a compressed gas pipe 83'. The compressed gas in pipe 83' is combined with the compressed gas in line 83, and introduced into the regenerator 40 as stripping steam.

Dependent on the concentration of absorbing compound (s), such as potassium carbonate, in the absorbent solution, the partial pressure of $H_2O$ in the stream introduced into the recuperator cooler 61 may be substantially lower than the saturation point at the temperature in question. Accordingly, it may be necessary to add water into the circuit for cooling water for the recuperator cooler 61. Water may be added e.g. through make-up water pipe 86 introducing water into pipe 64, or make-up water pipe 88, for introduction of water into line 62. If the amount of water is sufficiently high to give a surplus of water into said cooling water circuit, water may be withdrawn, e.g. via water withdrawal pipe 87. This, together with the possibility of removing water from the absorbent solution by extra boiling in re-boiler 42, preserves the important overall system water balance. Water for introduction through make-up line 86 or 88 may be taken from any convenient source of water of the required quality and purity, such as water condensed and removed in other parts the plant, or water specially prepared for the intended use.

$CO_2$ absorption is an exothermic process, whereas desorption is an endothermic process. Energy supplied to the regenerator is needed to generate steam used as stripping gas to remove the released $CO_2$ from the absorbent solution, to supply reaction energy, and to provide some heating of the absorbent as it flows downwards in the regenerator. Accordingly, steam generation consumes a substantial part of the energy required for the $CO_2$ capture. Reduction of the duty of the reboiler, which normally is responsible for most of the steam generated for regeneration of the absorbent, will reduce the energy cost for $CO_2$ capture. Flashing of the lean absorbent, compression of the flashed steam and introduction of this steam as stripping steam into the regenerator is described in U.S. Pat. No. 4,160,810, to Benson et al., as the importance of reducing the reboiler duty was seen as important to reduce cost.

EXAMPLE

Calculations have been made for a plant as described above, with reference to FIG. 1 and the embodiment of the flashing or the cooling water for the recuperator cooler 61 as described with reference to FIG. 2.

The calculations are made based on an incoming exhaust gas from a coal fired power plant at generation/transformation of 565 MW thermal, which based on an average power efficiency of about 45% give 254 MWe. 235.8 kg/s exhaust gas, including 53.4 kg/s $CO_2$, i.e. 22.7% by weight $CO_2$ of the total exhaust gas, is produced. The temperature is 90° C. The calculations are based on capture of 48 kg/s $CO_2$, giving an efficiency of the capturing of about 90%, which is close to, or higher, than the normally specified efficiency of $CO_2$ capture in such $CO_2$ capture facilities.

In the calculated example, the exhaust gas is cooled from 90° C., to 25° C. in the exhaust gas cooler 6, resulting in condensation of water which reduces the exhaust gas mass flow to 225 kg/s, subsequently introduced into the compressor 10. The cooled exhaust gas is compressed to 12 bara in compressor 10, resulting in a temperature of the compressed exhaust gas of 363° C. in line 12, at which temperature and pressure the exhaust gas is introduced into the heat exchanger 13. In heat exchanger 13, the incoming exhaust gas from pipe 12 is cooled to a temperature of 176° C., against lean exhaust gas introduced through pipe 32. In this process, the lean exhaust gas is heated from 118° C. to 348° C.

The incoming exhaust gas is introduced into reboiler heat exchanger at a temperature of 176° C., and is cooled therein to a temperature of 134° C., to generate 4.5 kg/s steam at 128° C. from 4.5 kg/s incoming water at 127° C. The exhaust gas leaving the heat exchanger 15 is introduced into heat exchanger 22, where it is further cooled against lean exhaust gas withdrawn from the absorber 30, which is introduced into the heat exchanger 22 at a temperature of 96° C., and heated in the heat exchanger to a temperature of 119° C.

2545 kg/s rich absorbent at a pressure of 11.7 bara is withdrawn from the absorber in pipe 37, and the pressure is reduced to 1.3 bara as described above, before the absorbent is introduced into the regenerator 40 for regeneration.

A substantial part of the energy put into the $CO_2$ capture process is related to the regeneration of the absorbent, and a lot of effort has been made to reduce the net energy requirement in this part of the process by several parties. The reboiler is often the major heat consuming element of the plant, a unit that according to the present invention receives heat, in the form of steam, from the reboiler heat exchanger 15 via pipes 19, 20. Condensation of this steam occurs in the hot side of the reboiler at mainly 128° C., to produce condensate at about 127° C. On the cold side of the re-boiler, absorbent is partly vaporized to produce about 4.5 kg/s steam. The temperature of this absorbent/steam mixture is 110° C., and the pressure is 1.31 bara. The mixture is introduced into to regenerator 40 where the steam fraction serves as stripping steam. Additional stripping steam, 44.9 kg/s, and CO2, 22.5 kg/s, at a temperature of 134° C. and pressure of 1.31 bara, is generated by flashing of lean absorbent in flash tank 45 and compressing the flashed steam and CO2, at an energy cost for compression of 4 MWe.

The recuperator cooler 61 and the cycle for the cooling water by flashing and compressing steam generated by flashing, and introduction of the compressed steam as additional stripping steam, gives 25 kg/s steam at a temperature of 221° C., and a pressure of 1.31 bara. This steam is introduced into the regenerator as additional stripping steam, at an energy cost for compression and circulating the water of 7 MWe. The alternative for obtaining the 25 kg/s of steam would be to withdraw steam from the connected power plant, or to heat the reboiler by electrical power, which would have an equivalent energy cost of 13 MWe and 61 MWe respectively for the required amount of steam.

A reduction of the demand of energy supplied to the $CO_2$ capture plant for generation of the 25 kg/s steam generated by flashing of the returned cooling water from the recuperator cooler, from 13 MWe to 7 MWe, correspond to an saving corresponding to 2.5% of the total production of electrical power from the plant, or 12.5% of the energy cost for the capture of $CO_2$. From an economic point of view, this energy saving is very significant.

The lean exhaust gas leaving heat exchanger 13 at a temperature of 348° C. and a pressure of 11.3 bara, is expanded over expander 34, to a pressure of 1.02 bara, which also reduces the temperature thereof to 82.4° C. Compression in compressor 10 requires 80 MW, whereas 51 MW is recovered by expander 34, resulting in net energy cost of 29 MW for the compression. The figures in this example are based on efficiencies for of the shelf compressors and expanders of more moderate size than would be used in future capture units. Significant power savings can be made by designing tailor-made components for this process at full power plant size. If compressors and expanders with efficiencies comparable to what is achieved in modern large scale gas turbines are used in this process the electric energy cost of separation and compression of 90% of the $CO_2$ from a coal power plant can be as low as 8-10% of the heat generated in the power plant, depending on the level of heat integration with the power plant. This would mean a lowering of the electric energy generation efficiency of the whole plant in this example from 45% down to around 35-37%.

The invention claimed is:

1. A method for capturing $CO_2$ from a $CO_2$ containing exhaust gas, where the exhaust gas is compressed and thereafter cooled before the exhaust gas is introduced into an absorber, where the exhaust gas is brought in counter-current flow with an aqueous $CO_2$ absorbent solution introduced into the absorber, to give a lean exhaust gas that is withdrawn from the absorber, reheated against incoming compressed exhaust gas, and thereafter expanded and released into the atmosphere,
   where the rich absorbent having absorbed $CO_2$, is collected at the bottom of the absorber, withdrawn therefrom and introduced into a regenerator in which the $CO_2$ rich absorbent is stripped to release $CO_2$ by counter-current flow of steam to give a lean absorbent, withdrawing steam and $CO_2$ from the top of the regenerator, collecting lean absorbent at the bottom of the regenerator, withdrawing the lean absorbent from the regenerator, splitting the withdrawn lean absorbent into two part flows, a first flow that is heated and vaporized in a reboiler, and introducing the regenerated absorbent into the regenerator as stripping steam, and a second flow that is returned to the absorber as lean absorbent,
   wherein the aqueous $CO_2$ absorbent solution is an aqueous potassium carbonate solution, and wherein the steam and $CO_2$ withdrawn from the regenerator is cooled in a direct contact cooler by counter-current flow of cooling water, to generate a gaseous flow of cooled $CO_2$ and steam that is withdrawn for compression and drying of the $CO_2$, and a liquid flow of cooling water and condensed steam that is withdrawn and flashed, to give a cooled liquid phase that is recycled as cooling water for the direct contact cooler for the withdrawn $CO_2$ and steam, and a gaseous phase that is compressed and thus heated, and introduced into the regenerator as stripping steam.

2. The method according to claim 1, wherein the second flow of lean absorbent is flashed to generate steam that is compressed and introduced into the regenerator as stripping steam.

3. The method of claim 1, wherein the lean first flow of lean absorbent introduced into the reboiler is heated and evaporated against steam generated in a steam cycle against hot compressed incoming exhaust gas.

4. The method according to claim 1, wherein the incoming exhaust gas is compressed from a pressure between 0.7 and 1.4 bara, to a pressure between 8 and 20 bara.

5. A plant for capturing of $CO_2$ from a $CO_2$ containing exhaust gas, comprising:
   an exhaust withdrawal pipe(s);
   one or more exhaust gas compressor(s) for compression of the exhaust gas;
   a compressed exhaust gas line for leading the compressed gas into one or more heat exchangers, for cooling of the compressed exhaust gas against $CO_2$ lean exhaust gas;
   a cooled exhaust gas pipe connected to an absorber for absorption of $CO_2$ by countercurrent flow against a liquid absorbent;
   a lean exhaust gas pipe for introduction of the lean exhaust gas into heat exchanger(s) for heat exchanging against hot compressed exhaust gas;
   a cooled lean exhaust gas pipe for transferring the heated lean exhaust gas from heat exchanger(s) to a turbine for expanding of the lean exhaust gas;
   a lean absorbent pipe for introduction of lean absorbent into the absorber;
   a rich absorbent pipe to withdraw rich absorbent from the absorber, the rich absorbent pipe being connected to a regenerator for introduction of the rich absorbent into the regenerator;
   a reboiler for generation of stripping steam;
   a steam introduction pipe to introduce the generated stripping steam into the regenerator;
   a lean absorbent withdrawal pipe connected to the lean absorbent pipe, for withdrawal of lean absorbent for recycling into the absorber; and
   an overhead withdrawal pipe connected to the regenerator for withdrawing steam and $CO_2$ released from the absorbent in the regenerator,
   wherein the overhead withdrawal pipe is connected to a recuperator cooler, wherein the $CO_2$ and steam are cooled by direct contact cooling against cooling water, a $CO_2$ withdrawal pipe for withdrawal of a gaseous phase from recuperator cooler, and a water withdrawal pipe for withdrawal of cooling water and condensed steam from the recuperator cooler, one or more flash tank(s) connected to the water withdrawal pipe for flashing the withdrawn water to separate a gaseous phase, and a liquid phase, a cooling water recycle line to recycle the liquid phase into the recuperator cooler, and a compressor for compression of the gaseous phase, and a compressed steam pipe for introduction into the regenerator as additional stripping steam.

6. The plant according to claim 5, wherein a flash tank is arranged for flashing the lean absorbent withdrawn in pipe to generate a steam phase and a liquid phase, where a compressor is arranged to compress the steam phase, and a compressed flash pipe is arranged to lead the compressed steam into the regenerator as additional stripping steam, and the lean absorbent pipe is arranged to introduce the liquid phase as lean absorbent into the absorber.

7. The plant according to claim 5, wherein a reboiler heat exchanger is arranged to generate steam by cooling incoming exhaust gas from an exhaust connection pipe, and where a reboiler steam return pipe is arranged to lead the generated steam into the reboiler to heat vaporize the lean absorbent therein.

8. The method according to claim 1, wherein the incoming exhaust gas is compressed from a pressure between 1 and 1.1 bara, to a pressure between 8 and 20 bara.

9. The method of claim 2, wherein the lean first flow of lean absorbent introduced into the reboiler is heated and evaporated against steam generated in a steam cycle against hot compressed incoming exhaust gas.

10. The method according to claim 2, wherein the incoming exhaust gas is compressed from a pressure between 0.7 and 1.4 bara, to a pressure between 8 and 20 bara.

11. The method according to claim 2, wherein the incoming exhaust gas is compressed from a pressure between 1 and 1.1 bara, to a pressure between 8 and 20 bara.

12. The method according to claim 3, wherein the incoming exhaust gas is compressed from a pressure between 0.7 and 1.4 bara, to a pressure between 8 and 20 bara.

13. The method according to claim 3, wherein the incoming exhaust gas is compressed from a pressure between 1 and 1.1 bara, to a pressure between 8 and 20 bara.

14. The plant according to claim 6, wherein a reboiler heat exchanger is arranged to generate steam by cooling incoming exhaust gas from an exhaust connection pipe, and where a reboiler steam return pipe is arranged to lead the generated steam into the reboiler to heat vaporize the lean absorbent therein.

* * * * *